US006359903B1

United States Patent
Shimade et al.

(10) Patent No.: US 6,359,903 B1
(45) Date of Patent: Mar. 19, 2002

(54) FRAME RELAY COMMUNICATION METHOD AND NETWORK FOR FIXED-BANDWIDTH TELEPHONE SIGNALS AND ALTERABLE-BANDWIDTH FACSIMILE SIGNALS

(75) Inventors: Hisashi Shimade; Masaki Komatsu, both of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/090,156

(22) Filed: Jun. 4, 1998

(30) Foreign Application Priority Data

Jun. 4, 1997 (JP) .............................................. 9-145668

(51) Int. Cl.⁷ .................................................. H04J 3/16
(52) U.S. Cl. ........................ 370/468; 370/230; 370/235; 370/252; 370/352; 370/395
(58) Field of Search ................................ 370/229, 230, 370/231, 232, 235, 236, 252, 253, 344, 412, 420, 463, 465, 468, 352, 353, 355, 356, 395, 410, 437; 375/222, 295, 316

(56) References Cited

U.S. PATENT DOCUMENTS

| 5,025,469 A | * | 6/1991 | Bingham | ................... | 375/222 |
|---|---|---|---|---|---|
| 5,351,134 A | | 9/1994 | Yaguchi et al. | .............. | 358/435 |
| 5,448,698 A | * | 9/1995 | Wilkes | ........................ | 370/420 |
| 6,111,870 A | * | 8/2000 | Kurtz | .......................... | 370/344 |
| 6,128,293 A | * | 10/2000 | Pfeffer | ........................ | 370/420 |

FOREIGN PATENT DOCUMENTS

| EP | 0 412 461 | 2/1991 | ............ H04N/1/32 |
|---|---|---|---|
| EP | 0 461 859 | 12/1991 | ............ H04N/1/32 |
| JP | 59-61336 | 4/1984 | ........... H04L/11/20 |
| JP | 6-105115 | 4/1994 | ........... H04N/1/32 |
| JP | 7-245692 | 9/1995 | ........... H04L/11/20 |
| JP | 8-293885 | 11/1996 | ........... H04L/12/56 |
| JP | 8-331171 | 12/1996 | ........... H04L/11/20 |
| WO | 94/09595 | 4/1994 | ............ H04N/7/13 |

OTHER PUBLICATIONS

Patent Abstracts of Japan, vol. 11, No. 376 (E–563), Dec. 8, 1987.
Patent Abstracts of Japan, vol. 012, No. 200 (E–619), Jun. 9, 1988.

* cited by examiner

Primary Examiner—Douglas Olms
Assistant Examiner—Shick Hom
(74) Attorney, Agent, or Firm—Sughrue Mion, PLLC

(57) ABSTRACT

In a communication network, a source frame relay unit responds to a signaling message from a source terminal by determining whether a communication link has a bandwidth sufficient to transmit a sound signal at a predetermined speed in a frame relay format, and forwards the message toward a destination frame relay unit to establish a connection if the link has a bandwidth sufficient to transmit the sound signal, or returns a busy tone otherwise. Responsive to a preamble tone signal from a destination terminal, the destination frame relay unit determines whether the link has a remaining bandwidth that can support the difference between the predetermined speed of the sound signal and a speed requested by the preamble tone signal to transmit facsimile signals in the frame-relay format. If so, the source and destination terminals are allowed to exchange facsimile signals at the requested speed. Otherwise, the terminals are controlled to exchange facsimile signals at a speed lower than the requested speed.

25 Claims, 3 Drawing Sheets

CONTROLLER 3B

FRAME RELAY COMMUNICATION METHOD AND NETWORK FOR FIXED-BANDWIDTH TELEPHONE SIGNALS AND ALTERABLE-BANDWIDTH FACSIMILE SIGNALS

BACKGROUND OF THE INVENTION

1. Field of the Invention

The present invention relates generally to communications networks, and more specifically to a telephone and facsimile communication network using the frame relay format.

2. Description of the Related At

Japanese laid-Open Patent Specification Hei-6-105115 discloses a communications network in which signals from subscriber telephones are assembled at the transmit end of a communication link into 53-byte ATM cells for transmission and disassembled at the receive end into the original format. On the other hand, signals from fax terminals are not assembled into the ATM cell format. Instead, they are segmented into blocks of predetermined length and time-division multiplexed with the ATM cells of telephone signals and transmitted. At the receive end, the transmitted signals are demultiplexed from each other to recover the original telephone signals and fax data. While this prior art can avoid the use of overheads for facsimile transmission which would otherwise be wasted by ATM cell headers, the bandwidth allocated to the facsimile communication is fixed and cannot be altered to meet required transmission speed if it is higher than the speed of transmission of ATM cells. Under such circumstances, a fallback procedure is initiated to perform fax communication at a reduced speed.

Therefore, a need exists to support the requested fax transmission speed if it is higher than the speed of transmission of telephone-related sound signals.

SUMMARY OF THE INVENTION

It is therefore an object of the present invention to provide a communication method and network where the bandwidth of a facsimile communication is determined by the remaining resource availability of a communication link after a portion of the link resource is allocated for voice-band transmission.

According to a first aspect of the present invention, there is provided a method of communication between source and destination frame relay units interconnected by a communication link. According to the method, the source frame relay unit determines, in response to a signaling message from a source terminal, whether a communication link between the terminals has a bandwidth sufficient to transmit a sound signal at a predetermined speed in a frame-relay format, and forwards the signaling message to the destination frame relay unit to establish a connection between the source terminal and a destination terminal if the link has a bandwidth sufficient to transmit the sound signal, so that a preamble tone signal is sent from the destination terminal to the source terminal. The source frame relay unit returns a busy tone signal to the source terminal if the link has a bandwidth insufficient to transmit the sound signal. Responsive to the preamble tone signal, the destination frame relay unit determines whether the link has a remaining bandwidth sufficient to support the difference between the predetermined speed of the sound signal and a speed requested by the preamble tone signal in order to transmit facsimile signals in the frame-relay format. If the link is capable of supporting the difference speed, the source and destination terminals are allowed to exchange facsimile signals at the requested speed. Otherwise, the source and destination terminals are controlled to exchange facsimile signals at a speed lower than the requested speed.

According to a second aspect, the present invention provides a communication network comprising a first frame assembler/disassembler for providing frame assembly and disassembly according to frame-relay format, a first voice-band compander connected between a first telephone switching system and the first frame assembler/disassembler, a first fax transceiver connected between the first telephone switching system and the first frame assembler/disassembler, and a first controller. The first controller is responsive to a signaling message from the first telephone switching system for determining whether a communication link has a bandwidth sufficient to transmit a compressed signal from the first voice-band compander, forwarding the signaling message to the communication link if the link has the sufficient bandwidth and returning a busy tone signal to the first telephone switching system if the link has not sufficient bandwidth. The network further includes a second frame assembler/disassembler connected to the first frame assembler/disassembler via the communication link for providing frame assembly and disassembly according to the frame-relay format, a second voice-band compander connected between a second telephone switching system and the second frame assembler/disassembler, a second fax transceiver connected between the second telephone switching system and the second frame assembler/disassembler, and a second controller. The second controller is responsive to the signaling message from the communication link to establish a connection in the second telephone switching system so that an audio signal can be sent between the first and second voice-band companders and responsive to a preamble tone signal from the second telephone switching system for determining whether the link has a remaining bandwidth which can support the difference between the transmission speed of the compressed signal and a speed requested by the preamble tone signal. The second controller allows the first and second fax transceivers to exchange facsimile signals at the requested speed if the link can support the difference speed and causes them to exchange facsimile signals at a speed lower than the requested speed if the link cannot support the difference speed.

BRIEF DESCRIPTION OF THE DRAWINGS

The present invention will be described in further detail with reference to the accompanying drawings, in which.

DETAILED DESCRIPTION

Figure 1:
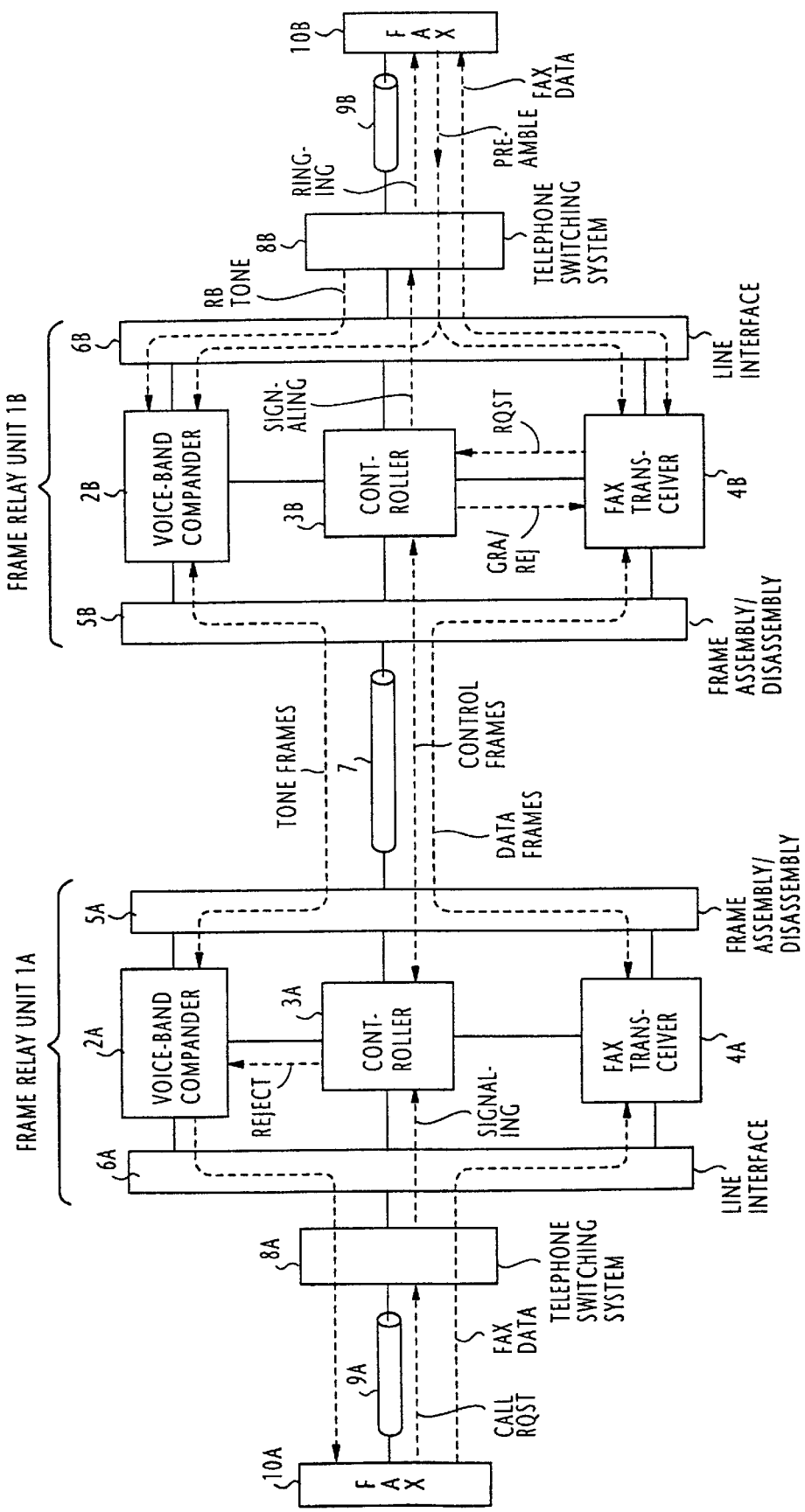
FIG. 1 is a block diagram of a frame relay network according to the present invention.

Referring to FIG. 1, there is shown a frame relay communication network according to the present invention. The network generally comprises frame relay units 1A and IB interconnected by a communication link 7. Each frame relay system comprises a voice-band compander (compressor/expander) 2, a controller 3 and a facsimile (fax) transceiver 4, all of which are connected to the communication link 7 via a frame assembly/disassembly unit 5. A line interface 6 is provided for interfacing its own controller 3 to an associated telephone switching system 8 which serves a fix terminal 10 through a subscriber loop 9. Communication between the switching system 8 and the interface 6 is carried on a 64-kbps PCM digital channel in each direction of transmission. A tone signal from a fax terminal 10 is carried on the 64-kbps channel and compressed by the voice-band compander 2 to an 8-kbps digital signal using CS-ACELP (Conjugate Structure Algebraic Code Excited Linear Prediction) coding technique as recommended by the ITU-T Recommendation G. 729. Facsimile data signals are also carried on the 64-kbps channel, but supplied to the fix transceiver 4. However, the preamble tone from a destination fix terminal is received by both voice-band compander 2 and fax transceiver 4. Signaling message from a telephone switching system is received by the associated controller 3 as will be described. Each frame assembly/disassembly (FRAD) unit 5 formulates a frame according to the frame-relay format and transmits it to the other frame relay unit. Each frame comprises a frame-type indicator and payload bits encapsulated between a frame header and a frame footer. Three types of frame are used in the system: control frame, tone frame and data frame. The frame-type indicator of each frame is used by the frame disassembler at the receive end of communication link 7 to identify the received frame for coupling to one of voice-band compander 2, controller 3 and fax transceiver 4.

The control frame carries signaling information associated with call setup and clearing procedures to be exchanged between the controllers 1A and 1B. As will be described in detail later, the control frame further carries available bandwidth information when negotiation is performed between the two controllers. The payload bits carried by the analog-data frame include tonal signals such as ringback tone, busy tone and preamble tone. Voice-band companders 2A and 2B exchange the analog-data frames. The fax-data frame is exchanged between fax transceivers 4A and 4B.

Each of the frame assembly/disassembly (FRAD) units 5A, 5B includes a first buffer for receiving frames from the communication link 7 and a second buffer for receiving signals from the voice-band compander 2, the controller 3 and the fax transceiver 4, and means for identifying each frame in the first buffer for coupling to appropriate one of the associated units 2, 3 and 4 according to their frame type identifiers. In addition, each FRAD unit further includes means for inserting each signal in the second buffer into the payload field of a frame and an appropriate frame tpe indicator into the frame for transmission.

Each of the voice-band companders 2A, 2B, the controllers 3A, 3B and fax transceivers 4A, 4B extracts the contents of a supplied frame from its payload field and provides segmentation of signals from the line interface into blocks of size corresponding to the payload field of a frame.

Each fax transceiver, when operating as a destination controller, receives a preamble tone from the destination fax terminal. Indicating the operating speed the fax terminal. When this preamble is received, the fax transceiver applies a bandwidth request to the associated controller 3 asking whether the operating speed (bandwidth) is available in the remaining resources of the communication link 7. The fax transceiver has a replica of a fax terminal capable of transmitting signals in a standardized signal format to a destination fax terminal in order to function as a proxy of the source fax terminal when the requested bandwidth is not available and a fallback procedure is then initiated. During transmission mode, fax data from each terminal is relayed through the fax transceivers 4A and 4B by inserting it in the payload field of a fax frame and transmitting it.

Figure 2A:
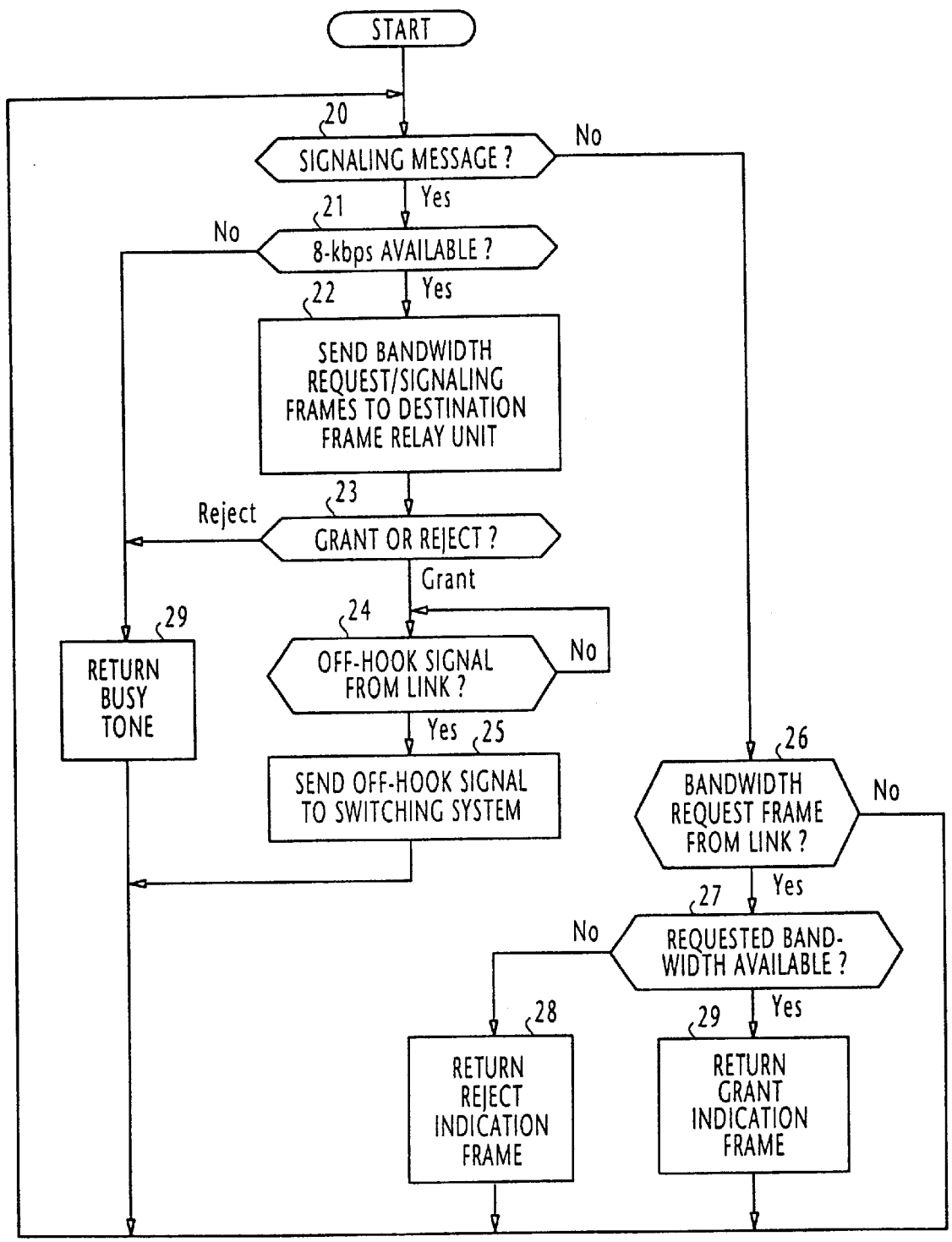
FIG. 2A is a flowchart of the operation of a controller when functioning as a source side controller.
Figure 2B:
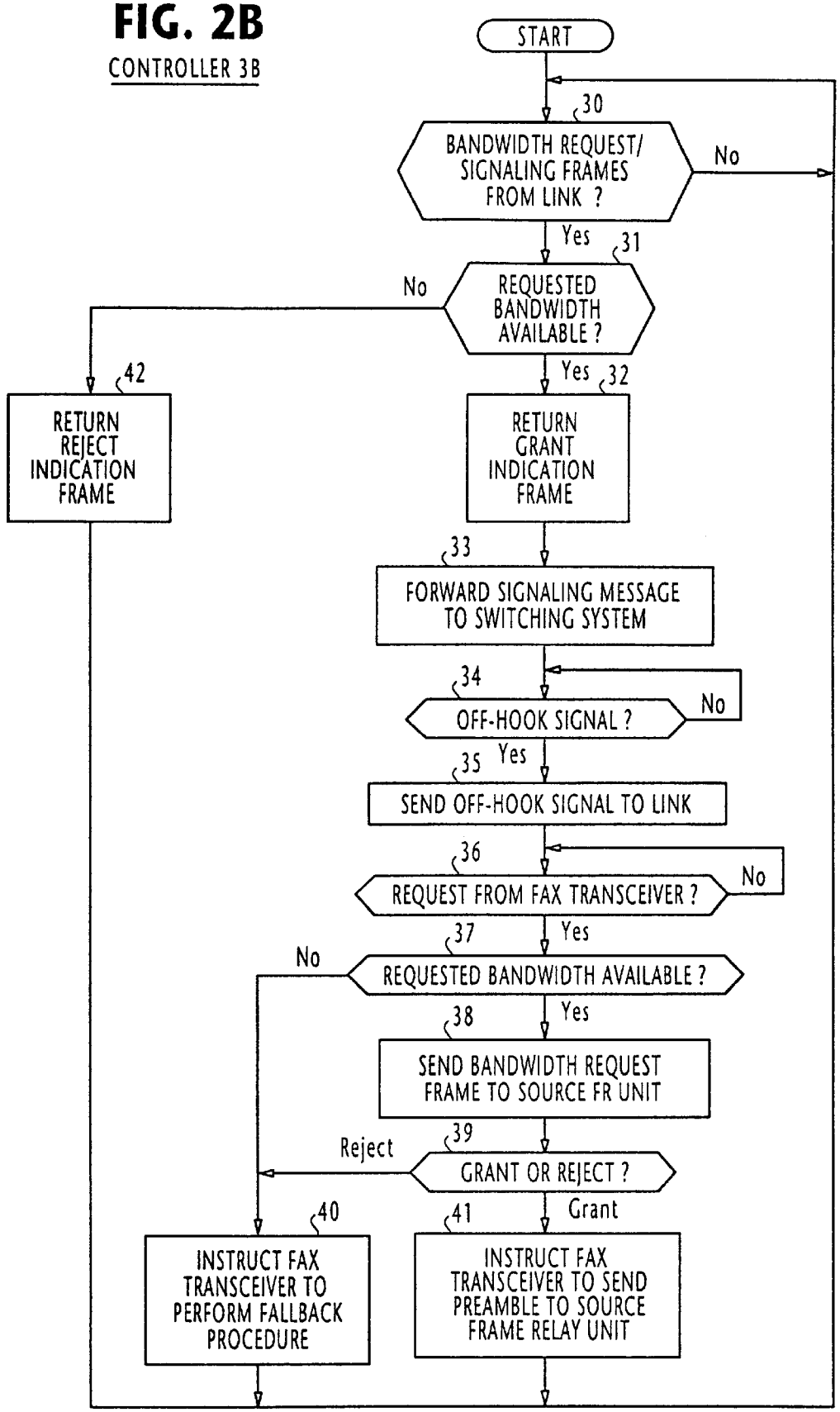
FIG. 2B is a flowchart of the operation of a controller when functioning as a destination side controller.

The operation of the controllers 3A and 3B will be understood with the aid of the flowcharts shown in FIGS. 2A and 2B by assuming that the fax terminal 10A is a source terminal having a document to transmit to the fax terminal 10B. Fax terminal 10A first sends a call request containing a multi-frequency tone signals to the telephone switching system 8A, which responds to it by establishing a connection between the subscriber loop 9A and the interface 6A and transmitting a signaling message to the controller 3A (see also FIG. 1).

In FIG. 2A, the operation of the controller 3A begins by looping steps 20 through 25 to detect the arrival of a signaling message from the associated telephone switching system 8A or a bandwidth request frame from the distant frame relay unit 1B for negotiation. In response to receipt of a signaling message containing the address of the destination fax terminal 10B, (step 20), the controller 3A holds the received signaling message and examines the resources of the communication link 7 as viewed from the frame relay unit 1A and determines whether the 8-kbps bandwidth necessary for the transmission of audio signals is available (step 21). If the necessary bandwidth is not available, the controller 3A proceeds to step 29 to return a busy tone to the requesting terminal 10A. If the 8-kbps bandwidth is available, the controller 3A proceeds to step 22 to formulate a bandwidth request message and a signaling message and forwards them to the frame assembly/disassembly unit 5A so that these messages are placed in the payload fields of respective control frames to produce a bandwidth request frame and a signaling frame. These frames are then transmitted to the frame relay unit 1B, asking it whether the 8-kbps bandwidth is also available at the destination side of the link 7.

Therefore, the controller 3B receives the bandwidth request and signaling frames at step 30 from the link 7, it extracts the messages contained therein and holds the signaling message (FIG. 2B). Controller 3B proceeds to step 31 to determine whether or not the requested 8 kbps is available and returns a reject indication frame to the frame relay unit 1A if the requested resource is not available (step 42). Otherwise, it returns a grant indication frame (step 32).

At the frame relay unit 1A, the controller 3A checks to see if a grant or reject indication frame is received from the link 7 (step 23). If a reject indication frame is received, the controller 3A applies a reject indication to the voice-band compander 2A Compander 2A then produces a busy tone signal at 64 kbps and sends it to the telephone switching system 8A. If the source terminal 10A is an analog fax machine, the 64-kbps signal is converted to a corresponding analog signal before being sent to the source terminal 10A. If a grant indication is received, the controller 3A proceeds to step 24.

Meanwhile, the controller 3B forwards the signaling message to the associated telephone switching system 8B via the line interface 6B (step 33). Telephone switching system 8B responds to this signaling message by establishing a connection between the interface 6B and the subscriber loop 9B and sends a ringing signal to the fax terminal 10B, while returning a 64-kbps signal of ringback tone toward the source terminal 10A. This digital ringback tone signal is received by the voice-band compander 2B, where it is compressed into an 8-kbps signal and assembled by the FRAD unit 5B into a tone frame and transmitted. At the frame relay unit 1A, the tone frame is disassembled by the FRAD unit 5A and expanded to the 64-kbps format by the voice-band compander 2A and transmitted via the telephone switching system 8A to the source terminal 10A, so that it hears a ringback tone.

In response to the ringing signal, the fax terminal 10B goes off-hook. This off-hook condition is detected by the switching system 8B. Switching system 8B communicates this off-hook condition to the controller 3B (step 34), which in response sends an off-hook signal to the link 7 (step 35).

Controller 3A is waiting for an off-hook signal at step 24 after a grant indication frame was received from the frame relay unit 1B at step 23. When this signal is received, it relays it to the switching system BA to cause it to start a billing operation (step 25) and flow returns to the starting point of the routine.

Subsequently, a preamble tone is sent from the destination fax terminal 10B to the switching system 8B, which converts this preamble tone to a 64-kbps digital signal and sends it to the voice-band compander 2B as well as to the fax transceiver 4B. Voice-band compander 2B compresses the 64-kbps preamble signal to an 8-kbps signal and inserts it into the payload field of a tone frame for transmission to the frame relay unit 1A. At the frame relay unit 1A, the tone frame is disassembled by the FRAD unit 5A and expanded to the 64-kbps format by the voice-band compander 2A and transmitted through the telephone switching system 8A to the source terminal 10A, so that it hears the preamble tone.

Fax transceiver 4B, on the other hand, examines the received 64-kbps preamble signal and applies a request to the controller 3B, asking it whether the bandwidth requested by the preamble is available (step 36). If the fax transmission speed requested by the preamble is 14.4 kbps, the controller 3B checks to see if the communication link 7 has sufficient bandwidth to support more than 6.4 kbps corresponding to the speed difference between the 8 kbps of tone frames and the 14.4 kbps of data frames.

When this bandwidth request is received at step 36, the controller 3B examines the resource of the communication link 7 as viewed from the frame relate unit 1B and determines whether or not the requested bandwidth is available (step 37). If not, the flow proceeds from step 37 to step 40 to instruct the fax transceiver 4B to initiate a fallback procedure by sending to the destination fax terminal 10B a facsimile data signal at a transmission speed which is lower than the speed (7.2 kbps, for example), recognizing that an error has occurred during transmission, and sends a message at the reduced speed. This message is transmitted over the link 7 in a data frame and relayed through the fax transceiver 4A and transmitted to the source terminal 10A, requesting it to transmit its data at the reduced speed. In response, the source terminal 10A sets its speed to the speed of the received message and starts sending its fax data at the reduced speed.

If the bandwidth requested for the transmission of facsimile data signals is available as viewed from the destination end of the link 7, the controller 3B proceeds from step 37 to step 38 to send a bandwidth request message in a control frame to the frame relay unit 1A, asking whether or not the requested bandwidth is also available at the source end of the communication link 7.

When this control frame is received by the controller 3A at step 26, flow proceeds to step 27 where the controller 3A examines the resources of the communication link 7 as viewed from the source side and determines whether the requested bandwidth is available. If it is determined that the requested bandwidth is not available, the controller 3A proceeds to step 28 to return a reject indication frame to the destination frame relay unit 1B. Otherwise, the controller 3A proceeds to step 29A to return a grant indication frame.

On receiving the reject indication frame at step 39 (FIG. 2B), the controller 3B proceeds to step 40 to instruct the fax transceiver 4B to initiate a fallback procedure as described above. If a grant indication frame is received at step 39, the controller 3B proceeds to step 41 to instruct the fax transceiver 4B to send a preamble tone which is assembled into the payload field of a data frame and transmitted over the link to the fax transceiver 4A. This preamble tone signal is the same as that initially received from the fax terminal 10B. In this case, the fax transceiver 4B functions as a proxy for the fax terminal 10B.

Although the use of frame relay format for variable speed fax transmission may represent some overhead waste, it is advantageous over the use of ATM cell format since its variable frame length allows facsimile signals to be transmitted with reduced overhead.

What is claimed is:

1. A method of communication between source and destination frame relay units interconnected by a communication link, comprising:
   a) responsive to a signaling message from a source terminal, determining, at said source frame relay unit, whether a bandwidth of said communication link is sufficient to transmit a sound signal at a predetermined speed in a frame-relay format;
   b) if said bandwidth of said link is sufficient to transmit said sound signal, forwarding said signaling message from the frame source frame relay unit to the destination frame relay unit to establish a connection between said source terminal and a destination terminal so that a preamble tone signal is sent from the destination terminal back to the source terminal, and if said link has said bandwidth insufficient to transmit said sound signal, returning a busy tone signal from the source frame relay unit to the source terminal;
   c) responsive to said preamble tone signal, determining, at the destination frame relay unit, whether the bandwidth of said link is capable of supporting a transmit speed requested by the preamble tone signal to transmit facsimile signals in said frame-relay format, said transmit speed being higher than predetermined speed; and
   d) if said link can support said transmit speed, allowing the source and destination terminals to exchange facsimile signals at the requested transmit speed, and if said link cannot support said transmit speed, causing the source and destination terminals to exchange facsimile signals at a speed lower than the requested speed.

2. A method of communication between source and destination frame relay units interconnected by a communication link, comprising:
   a) responsive to a signaling message from a source terminal, determining, at said source frame relay unit, whether a bandwidth of said communication link is sufficient to transmit a sound signal at a predetermined speed in a frame-relay format;
   b) if said bandwidth of said link is sufficient to transmit said sound signal, forwarding said signaling message from the frame source frame relay unit to the destination frame relay unit to establish a connection between said source terminal and a destination terminal so that a preamble tone signal is sent from the destination terminal back to the source terminal, and if said link has said bandwidth insufficient to transmit said sound signal, returning a busy tone signal from the source frame relay unit to the source terminal;
   c) responsive to said preamble tone signal, determining, at the destination frame relay unit, whether the bandwidth of said link is capable of supporting a transmit speed requested by the preamble tone signal to transmit facsimile signals in said frame-relay format, said transmit speed being higher than predetermined speed;

d) if said link can support said transmit speed, allowing the source and destination terminals to exchange facsimile signals at the requested transmit speed, and if said link cannot support said transmit speed, causing the source and destination terminals to exchange facsimile signals at a speed lower than the requested speed; and e) wherein step a comprises the step of determining whether said link has said sufficient bandwidth as viewed from both sides of said source and destination terminals, and wherein step b is arranged to forward said signaling message to the destination terminal if said link has said sufficient bandwidth as viewed from either of said sides.

3. A method of communication between source and destination frame relay units interconnected by a communication link, comprising:

a) responsive to a signaling message from a source terminal, determining, at said source frame relay unit, whether a bandwidth of said communication link is sufficient to transmit a sound signal at a predetermined speed in a frame-relay format;

b) if said bandwidth of said link is sufficient to transmit said sound signal, forwarding said signaling message from the frame source frame relay unit to the destination frame relay unit to establish a connection between said source terminal and a destination terminal so that a preamble tone signal is sent from the destination terminal back to the source terminal, and if said link has said bandwidth insufficient to transmit said sound signal, returning a busy tone signal from the source frame relay unit to the source terminal;

c) responsive to said preamble tone signal, determining, at the destination frame relay unit, whether the bandwidth of said link is capable of supporting a transmit speed requested by the preamble tone signal to transmit facsimile signals in said frame-relay format, said transmit speed being higher than predetermined speed;

d) if said link can support said transmit speed, allowing the source and destination terminals to exchange facsimile signals at the requested transmit speed, and if said link cannot support said transmit speed, causing the source and destination terminals to exchange facsimile signals at a speed lower than the requested speed; and e) wherein step c comprises the step of determining whether said link has said remaining bandwidth as viewed from both sides of said source and destination terminals, and wherein step d is arranged to allow said source and destination terminals to exchange the facsimile signals at the requested transmit speed if said link has said remaining bandwidth as viewed from either of said sides.

4. A method of communication between source and destination frame relay units interconnected by a communication link, comprising:

a) responsive to a signaling message from a source terminal, determining, at said source frame relay unit, whether a bandwidth of said communication link is sufficient to transmit a sound signal at a predetermined speed in a frame-relay format;

b) if said bandwidth of said link is sufficient to transmit said sound signal, forwarding said signaling message from the frame source frame relay unit to the destination frame relay unit to establish a connection between said source terminal and a destination terminal so that a preamble tone signal is sent from the destination terminal back to the source terminal, and if said link has said bandwidth insufficient to transmit said sound signal, returning a busy tone signal from the source frame relay unit to the source terminal;

c) responsive to said preamble tone signal, determining, at the destination frame relay unit, whether the bandwidth of said link is capable of supporting a transmit speed requested by the preamble tone signal to transmit facsimile signals in said frame-relay format, said transmit speed being higher than predetermined speed;

d) if said link can support said transmit speed, allowing the source and destination terminals to exchange facsimile signals at the requested transmit speed, and if said link cannot support said transmit speed, causing the source and destination terminals to exchange facsimile signals at a speed lower than the requested speed; and e) wherein signals transmitted over the communication link are organized in a frame according to frame-relay format, said frame containing an indicator representing a type of signal organized into the frame.

5. A method of communication between source and destination frame relay units interconnected by a communication link, comprising:

a) responsive to a signaling message from a source terminal, determining, at said source frame relay unit, whether a bandwidth of said communication link is sufficient to transmit a sound signal at a predetermined speed in a frame-relay format;

b) if said bandwidth of said link is sufficient to transmit said sound signal, forwarding said signaling message from the frame source frame relay unit to the destination frame relay unit to establish a connection between said source terminal and a destination terminal so that a preamble tone signal is sent from the destination terminal back to the source terminal, and if said link has said bandwidth insufficient to transmit said sound signal, returning a busy tone signal from the source frame relay unit to the source terminal;

c) responsive to said preamble tone signal, determining, at the destination frame relay unit, whether the bandwidth of said link is capable of supporting a transmit speed requested by the preamble tone signal to transmit facsimile signals in said frame-relay format, said transmit speed being higher than predetermined speed;

d) if said link can support said transmit speed, allowing the source and destination terminals to exchange facsimile signals at the requested transmit speed, and if said link cannot support said transmit speed, causing the source and destination terminals to exchange facsimile signals at a speed lower than the requested speed; and e) wherein said sound signal is a compressed digital signal having a transmission speed lower than 64 kilobits per second.

6. A communication network, comprising:

a first frame assembler/disassembler for providing frame assembly and disassembly according to frame-relay format;

a first voice-band compander connected between a first telephone switching system and said first frame assembler/disassembler;

a first fax transceiver connected between said first telephone switching system and said first frame assembler/disassembler;

a first controller responsive to a signaling message from the first telephone switching system for determining whether a communication link has a bandwidth sufficient to transmit a compressed signaling message from the first voice-band compander, forwarding said signaling message to the communication link if the link has said sufficient bandwidth and returning a busy tone signal to the first telephone switching system if the link has insufficient bandwidth;

a second frame assembler/disassembler connected to the first frame assembler/disassembler via said communication link for providing frame assembly and disassembly according to the frame-relay format;

a second voice-band compander connected between a second telephone switching system and said second frame assembler/disassembler;

a second fax transceiver connected between said second telephone switching system and said second frame assembler/disassembler; and a second controller responsive to said signaling message from the communication link to establish a connection in said second telephone switching system so that an audio signal can be sent between said first and second voice-band companders and responsive to a preamble tone signal from the second telephone switching system for determining whether the bandwidth of said link can support a transmit speed requested by the preamble tone signal, said transmit speed being higher than predetermined speed, said second controller allowing the first and second fax transceivers to exchange facsimile signals at the requested transmit speed if said link can support the transmit speed and causing the first and second fax transceivers to exchange facsimile signals at a speed lower than the requested transmit speed if said link cannot support the transmit speed.

7. The network of claim 6, wherein each of the first and second frame assemblers/disassemblers assembles a signal in a frame according to frame-relay format, said frame containing an indicator representing type of the signal assembled in the frame.

8. The network of claim 7, wherein each of said first and second voice-band compander is arranged to compress a 64 kilobits per second signal.

9. The network of claim 6, wherein each of the first and second controllers exchange information to determine bandwidth availability of said communication link.

10. The frame according to claim 4, wherein said type of signal organized into the frame denotes a control frame, a tone frame, or a data frame.

11. A method of communication between source and destination terminals interconnected by a communication link, comprising:

a) responsive to a signaling message from a source terminal, determining whether a bandwidth of said communication link is sufficient to transmit a first signal at a predetermined speed;

b) if said bandwidth of said link is sufficient to transmit said first signal, forwarding said signaling message from the source terminal to a destination terminal to establish a connection so that a preamble signal is sent from the destination terminal back to the source terminal, and if said link has said bandwidth insufficient to transmit said first signal, returning a busy signal signifying inability to transmit said first signal from the source terminal to the destination terminal;

c) responsive to said preamble signal, determining, at the destination terminal, whether the bandwidth of said link is capable of supporting a transmit speed requested by the preamble signal to transmit a second signal, said transmit speed being a speed other than the predetermined speed; and d) if said link can support said transmit speed, allowing the source and destination terminals to exchange said second signal at the requested transmit speed, and if said link cannot support said transmit speed, causing the source and destination terminals to exchange said second signal at a speed other than the requested speed.

12. The method of communication of claim 11, wherein the transmit speed being a speed other then the predetermined speed is a speed higher than the predetermined speed.

13. The method of communication of claim 11, wherein the transmit speed being a speed other then the predetermined speed is a speed lower than the predetermined speed.

14. A method of communication between source and destination terminals interconnected by a communication link, comprising:

a) responsive to a signaling message from a source terminal, determining whether a bandwidth of said communication link is sufficient to transmit a first signal at a predetermined speed;

b) if said bandwidth of said link is sufficient to transmit said first signal, forwarding said signaling message from the source terminal to the destination terminal to establish a connection so that a preamble signal is sent from the destination terminal back to the source terminal, and if said link has said bandwidth insufficient to transmit said first signal, returning a busy signal signifying inability to transmit said first signal from the source terminal to the destination terminal;

c) responsive to said preamble signal, determining, at the destination terminal, whether the bandwidth of said link is capable of supporting a transmit speed requested by the preamble signal to transmit a second signal, said transmit speed being a speed other than the predetermined speed;

d) if said link can support said transmit speed, allowing the source and destination terminals to exchange said second signal at the requested transmit speed, and if said link cannot support said transmit speed, causing the source and destination terminals to exchange said second signal at a speed other than the requested speed; and e) wherein step a comprises the step of determining whether said link has said sufficient bandwidth as viewed from both sides of said source and destination terminals, and wherein step b is arranged to forward said signaling message to the destination terminal if said link has said sufficient bandwidth as viewed from either of said sides.

15. The method of communication of claim 14, wherein the transmit speed being a speed other then the predetermined speed is a speed higher than the predetermined speed.

16. The method of communication of claim 14, wherein the transmit speed being a speed other then the predetermined speed is a speed lower than the predetermined speed.

17. A method of communication between source and destination terminals interconnected by a communication link, comprising:

a) responsive to a signaling message from a source terminal, determining whether a bandwidth of said communication link is sufficient to transmit a first signal at a predetermined speed;

b) if said bandwidth of said link is sufficient to transmit said first signal, forwarding said signaling message from the source terminal to the destination terminal to establish a connection so that a preamble signal is sent from the destination terminal back to the source terminal, and if said link has said bandwidth insufficient to transmit said first signal, returning a busy signal signifying inability to transmit said first signal from the source terminal to the destination terminal;

c) responsive to said preamble signal, determining, at the destination terminal, whether the bandwidth of said link is capable of supporting a transmit speed requested by the preamble signal to transmit a second signal, said transmit speed being a speed other than the predetermined speed;

d) if said link can support said transmit speed, allowing the source and destination terminals to exchange said second signal at the requested transmit speed, and if said link cannot support said transmit speed, causing the source and destination terminals to exchange said second signal at a speed other than the requested speed; and e) wherein step c comprises the step of determining whether said link has said available bandwidth as viewed from both sides of said source and destination terminals, and wherein step d is arranged to allow said source and destination terminals to exchange said second signal at the requested transmit speed if said link has said available bandwidth as viewed from either of said sides.

18. The method of communication of claim 17, wherein the transmit speed being a speed other then the predetermined speed is a speed higher than the predetermined speed.

19. The method of communication of claim 17, wherein the transmit speed being a speed other then the predetermined speed is a speed lower than the predetermined speed.

20. A method of communication between source and destination terminals interconnected by a communication link, comprising:

a) responsive to a signaling message from a source terminal, determining whether a bandwidth of said communication link is sufficient to transmit a first signal at a predetermined speed;

b) if said bandwidth of said link is sufficient to transmit said first signal, forwarding said signaling message from the source terminal to the destination terminal to establish a connection so that a preamble signal is sent from the destination terminal back to the source terminal, and if said link has said bandwidth insufficient to transmit said first signal, returning a busy signal signifying inability to transmit said first signal from the source terminal to the destination terminal;

c) responsive to said preamble signal, determining, at the destination terminal, whether the bandwidth of said link is capable of supporting a transmit speed requested by the preamble signal to transmit a second signal, said transmit speed being a speed other than the predetermined speed;

d) if said link can support said transmit speed, allowing the source and destination terminals to exchange said second signal at the requested transmit speed, and if said link cannot support said transmit speed, causing the source and destination terminals to exchange said second signal at a speed other than the requested speed; and e) wherein signals transmitted over the communication link are organized in a frame according to frame-relay format, said frame containing an indicator representing a type of signal organized into the frame.

21. The method of communication of claim 20, wherein the transmit speed being a speed other then the predetermined speed is a speed higher than the predetermined speed.

22. The method of communication of claim 20, wherein the transmit speed being a speed other then the predetermined speed is a speed lower than the predetermined speed.

23. A method of communication between source and destination terminals interconnected by a communication link, comprising:

a) responsive to a signaling message from a source terminal, determining whether a bandwidth of said communication link is sufficient to transmit a first signal at a predetermined speed;

b) if said bandwidth of said link is sufficient to transmit said first signal, forwarding said signaling message from the source terminal to the destination terminal to establish a connection so that a preamble signal is sent from the destination terminal back to the source terminal, and if said link has said bandwidth insufficient to transmit said first signal, returning a busy signal signifying inability to transmit said first signal from the source terminal to the destination terminal;

c) responsive to said preamble signal, determining, at the destination terminal, whether the bandwidth of said link is capable of supporting a transmit speed requested by the preamble signal to transmit a second signal, said transmit speed being a speed other than the predetermined speed;

d) if said link can support said transmit speed, allowing the source and destination terminals to exchange said second signal at the requested transmit speed, and if said link cannot support said transmit speed, causing the source and destination terminals to exchange said second signal at a speed other than the requested speed; and e) wherein said second signal is a compressed digital signal.

24. The method of communication of claim 23, wherein the transmit speed being a speed other then the predetermined speed is a speed higher than the predetermined speed.

25. The method of communication of claim 24, wherein the transmit speed being a speed other then the predetermined speed is a speed lower than the predetermined speed.

* * * * *